(12) United States Patent
Zhou et al.

(10) Patent No.: US 7,322,227 B2
(45) Date of Patent: Jan. 29, 2008

(54) TANK CONTAINER WITH ELECTRONIC MONITORING DEVICE

(75) Inventors: Shouqin Zhou, Guangdong (CN); Xiaochun Chen, Jiangsu (CN); Rong Liu, Jiangsu (CN); Wenqing Yuan, Jiangsu (CN); Chenguang Zhou, Jiangsu (CN); Jianbin Zhu, Jiangsu (CN)

(73) Assignees: China International Marine Containers (Group) Co., Ltd., Guangdong, P.R. (CN); Nantong CIMC Tank Equipment Co., Ltd., Jiangsu, P.R. (CN); Nantong CIMC Special Transportation Equipment Manufacture Co., Ltd., Jiangsu, P.R. (CN)

( * ) Notice: Subject to any disclaimer, the term of this patent is extended or adjusted under 35 U.S.C. 154(b) by 60 days.

(21) Appl. No.: 11/192,261

(22) Filed: Jul. 28, 2005

(65) Prior Publication Data

US 2006/0021423 A1 Feb. 2, 2006

(30) Foreign Application Priority Data

Aug. 2, 2004 (CN) ........................ 2004 1 0009395
Jun. 15, 2005 (CN) ........................ 2005 1 0011939

(51) Int. Cl.
*G01M 3/04* (2006.01)
*B67D 1/16* (2006.01)
(52) U.S. Cl. ........................ 73/49.2; 73/49.8; 222/110
(58) Field of Classification Search ................. 73/49.2, 73/49.8; 222/110
See application file for complete search history.

(56) References Cited

U.S. PATENT DOCUMENTS

| 4,911,326 | A | * | 3/1990 | McGouran, Jr. | ........ 220/560.03 |
| 5,136,877 | A | * | 8/1992 | Sharp | ........................ 73/49.2 |
| 5,533,648 | A | * | 7/1996 | Read et al. | ................. 222/108 |
| 5,711,456 | A | * | 1/1998 | Bryant | ....................... 222/108 |
| 5,934,830 | A | * | 8/1999 | Bouvier | ....................... 405/54 |
| 6,006,588 | A | * | 12/1999 | Cartwright et al. | .......... 73/49.2 |
| 6,079,252 | A | * | 6/2000 | Tabler et al. | ................... 73/40 |
| 6,651,703 | B2 | * | 11/2003 | Gershtein et al. | ............. 141/64 |
| 6,662,632 | B1 | * | 12/2003 | Parker et al. | ................... 73/40 |
| 6,701,776 | B2 | * | 3/2004 | Stetter | ........................ 73/49.2 |
| 6,925,868 | B2 | * | 8/2005 | Young et al. | ............. 73/290 V |
| 6,938,654 | B2 | * | 9/2005 | Gershtein et al. | ........... 141/231 |
| 2006/0033322 | A1 | * | 2/2006 | Suess | ........................ 280/830 |

* cited by examiner

*Primary Examiner*—Michael Cygan
(74) *Attorney, Agent, or Firm*—Greer, Burns & Crane, Ltd.

(57) ABSTRACT

A tank container with electronic monitoring device includes a tank barrel and a container frame supporting the same. The tank barrel includes a valve assembly and a valve assembly protection box. The electronic monitoring device is installed inside the valve assembly protection box, or on a sealing surface of the tank barrel, or in a range of the container frame outside the tank barrel. The electronic monitoring device includes a sensor for detecting a leakage condition of the cargoes contained in the tank container and transmitting an information data related to the leakage condition, and a data processing module connected with the sensor for processing the data. The invention can be used for detecting a sealing condition of a sealing surface and an illegal open of a lid of the valve assembly protection box as well as for realizing a global tracking, whereby ensuring a safe transport for containers.

12 Claims, 10 Drawing Sheets

TANK CONTAINER WITH ELECTRONIC MONITORING DEVICE

This application claims the benefit of Chinese Patent Application Nos. 200410009395.8 filed on Aug. 2, 2004 and 200510011939.9 filed on Jun. 15, 2005, which are hereby incorporated by reference.

FIELD OF THE INVENTION

The present invention relates to a tank container, and more particularly, to a tank container with electronic monitoring device for detecting the sealing condition of a sealing surface and the happening of illegally opening a lid of a valve assembly protection box as well as for realizing a global tracking.

BACKGROUND OF THE INVENTION

Generally, a tank container loads dangerous chemical cargoes which are combustible, explosive, poisonous, hazardous and strong corrosive. Therefore it is visualized to be "a moving time bomb". The part in the tank container which is easiest to leak is a sealing surface of a valve assembly and a pipe connection thereof. Conventional tank containers have no means for detecting the leakage of the loaded cargoes, especially no monitoring device for detecting the sealing surface which is easiest to leak, resulting in a potential problem of being unsafe. Moreover, at present, sealing pads of PTFE or other materials are used between a flange of the tank barrel and the sealing surface of the valve assembly or other parts; bolts or other fixing means are used to connect the component parts; and a hydrostatic pressure test and gas-proof test will be conducted to the tank barrel for testing the sealing security of the sealing surface. In addition, a common practice for protecting the valve assembly is to install a valve assembly protection box with a lid such that it can turn around a hinge, use a pin assembly to lock the boxes and lids, and then attach a TIR sealer for protecting from artificial damage. However, this structure has some inherent disadvantages that it can be easily destroyed but can be recovered in a simple way, which will incur a possible danger.

SUMMARY OF THE INVENTION

Accordingly, an object of the present invention is to provide a tank container with electronic monitoring device for detecting sealing conditions of a tank barrel, a valve assembly and surfaces of their pipe connection, monitoring a possible illegal opening of a lid of a valve assembly protection box and recording a related information data, as well as for realizing a global tracking and a timely alerting by communicating with a remote monitoring center, whereby ensuring a safe transport for the tank container.

To achieve these and other objects, a tank container with electronic monitoring device includes a tank barrel and a container frame supporting the tank barrel, the tank barrel being further provided with a valve assembly and a valve assembly protection box for protecting the valve assembly. The electronic monitoring device is installed inside the valve assembly protection box, or on a sealing surface of the tank barrel, or in a range of the container frame outside the tank barrel. The electronic monitoring device includes: a sensor for detecting a leakage of the chemical cargo loaded in the tank container and transmitting an information data related to the leakage; and a data processing module connected with the sensor for processing the data related to the leakage. Further, the data processing module includes: a signal acquisition and processing module connected with the sensor for acquiring and processing the data related to the leakage from the sensor; a data storage and signal transmission module connected with the signal acquisition and processing module for storing and recording the data on the leakage processed by the signal acquisition and processing module, and transmitting the data on the leakage to a remote data terminal. Specifically, the data storage and signal transmission module is connected with the remote data terminal through a cable or in a wireless way. Furthermore, the electronic monitoring device has a unique ID code stored in the data storage and signal transmission module, the ID code being able to be transmitted to the remote data terminal, whereby a global tracking can be achieved.

In another aspect, an electronic monitoring device installed inside the valve assembly protection box further includes: a stroke switch with a probe connected with the signal acquisition and processing module through a cable; and a magnetic-reed switch for detecting an open or close status of said valve assembly protection box.

According to the present invention, by use of the electronic monitoring device, the tank container can effectively detect the leakage of dangerous chemical gas or the like, record at the same time the related information on leakage and transmit the related data, ensuring thus a safe transport for containers. Especially, the electronic monitoring device with sensors arranged in the valve assembly protection box takes full advantages of the effective space inside the valve assembly protection box, and is simple in structure, well concealed and easy to constitute, thereby providing an adequate protection for the valve assembly to prevent danger.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention, in which.

DETAILED DESCRIPTION OF THE PREFERRED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1A:
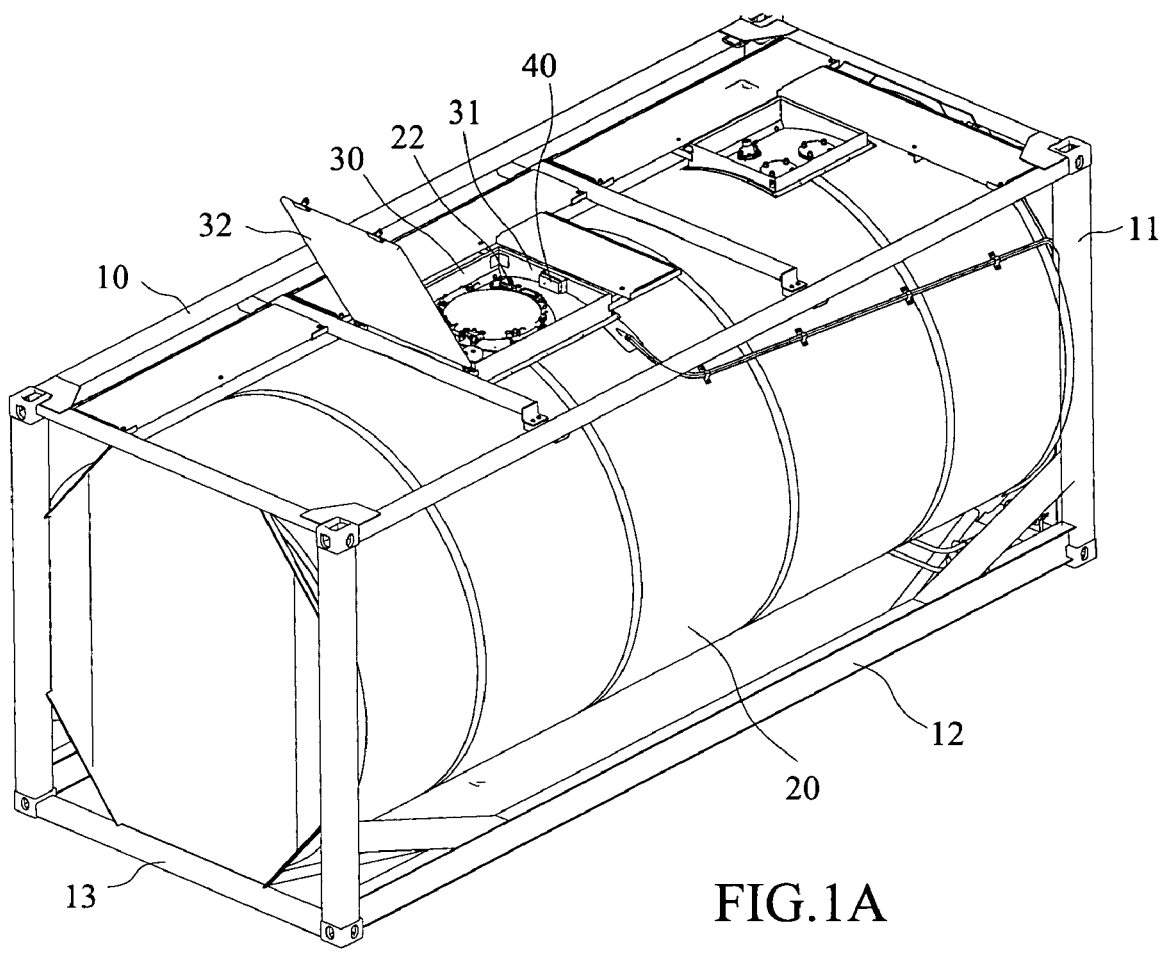
FIG. 1A is a schematic view of a structure of a first embodiment of a tank container with electronic monitoring device according to the invention, in which the electronic monitoring device is installed inside a valve assembly protection box.
Figure 1B:
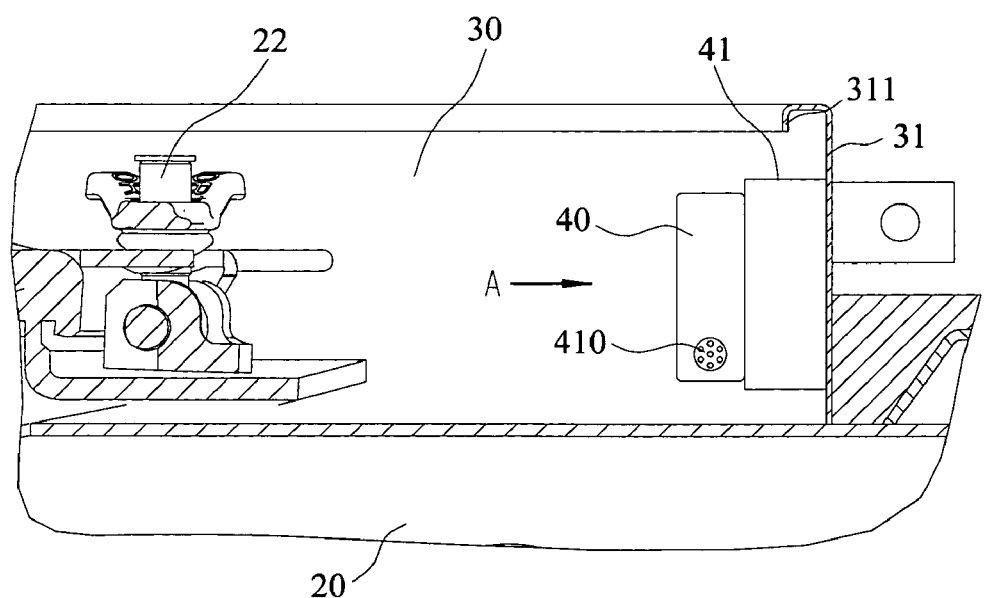
FIG. 1B is a partial sectional view of the electronic monitoring device when the valve assembly protection box is opened.
Figure 1C:
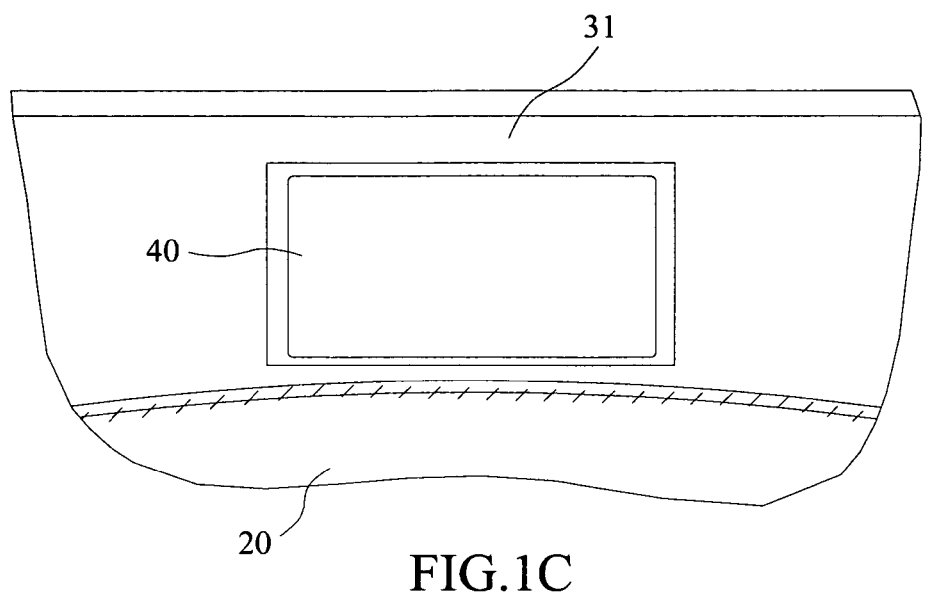
FIG. 1C is a schematic view of the electronic monitoring device taken along direction A in FIG. 1B

FIGS. 1A-1C illustrate a structure of a first embodiment of a tank container with electronic monitoring device according to the invention. In the first embodiment, the tank container includes a tank barrel 20 and a container frame 10 supporting the tank barrel 20. The container frame 10 has such a frame structure that it is constituted mainly by a frame side beam 12 and a frame end beam 13 connected in two layers to upper and lower ends of four frame corner post 11, forming a stably-supporting container body structure. In addition, a flange, a valve assembly 22, and a valve assembly protection box 30 for protecting the valve assembly 22 are provided on the tank barrel 20. The valve assembly protection box 30 includes an inner wall 31 and a lid 32 around the valve assembly.

An electronic monitoring device 40 is installed inside the valve assembly protection box 30, in particular, as shown in FIG. 1A, on the inner wall 31 at an open or closed end of the lid 32 of the valve assembly protection box 30. Moreover, the valve assembly protection box 30 can be provided with a sealing closure at its opening.

As shown in FIGS. 1B and 1C, a partial structure of the electronic monitoring device 40 installed inside the valve assembly protection box 30 is illustrated. The electronic monitoring device 40 includes a sensor and a data processing module (not shown) received in a box. The sensor senses substances contained in the tank container, such as chemicals, dangerous gases or others having combustible, explosive, poisonous, harmful and strong corrosive characters, by means of a sensing window 410 arranged on the box. In other words, the sensor can be a chemical sensor, a gas sensor, etc. Moreover, in order to more favorably sense the leakage, the electronic monitoring device 40 is preferably disposed at one side near the valve assembly 22, and the sensing window 410 is preferably formed near the valve assembly 22. Moreover, the sensing window 410 can be configured to be a shape of circle or a plurality of orifices as shown in FIG. 1B, or can be configured according to a sensing head of the sensor without limit to the above-mentioned shapes. As a result, when the sensor detects a leakage in the sealing surface of the valve assembly 22 and its pipe connection, that is, when the gas concentration inside the valve assembly protection box reaches a certain degree, a signal will be sent to a corresponding data processing module for data processing, whereby the happening of leakage is detected.

In addition, as shown in FIG. 1B, the electronic monitoring device 40 is fixed on the inner wall 31 through a support 41. The support 41, for example, can be disposed on one side of the inner wall 31 which is nearer to the valve assembly 22, or disposed on the inner wall 31 at the opening end of the valve assembly protection box 30. Besides, a part or a whole of the inner wall at the installation position of the support 41 turns towards the inner side of the valve assembly protection box, and further extends a predetermined distance, forming a reinforced protecting rib 311.

Figure 2A:
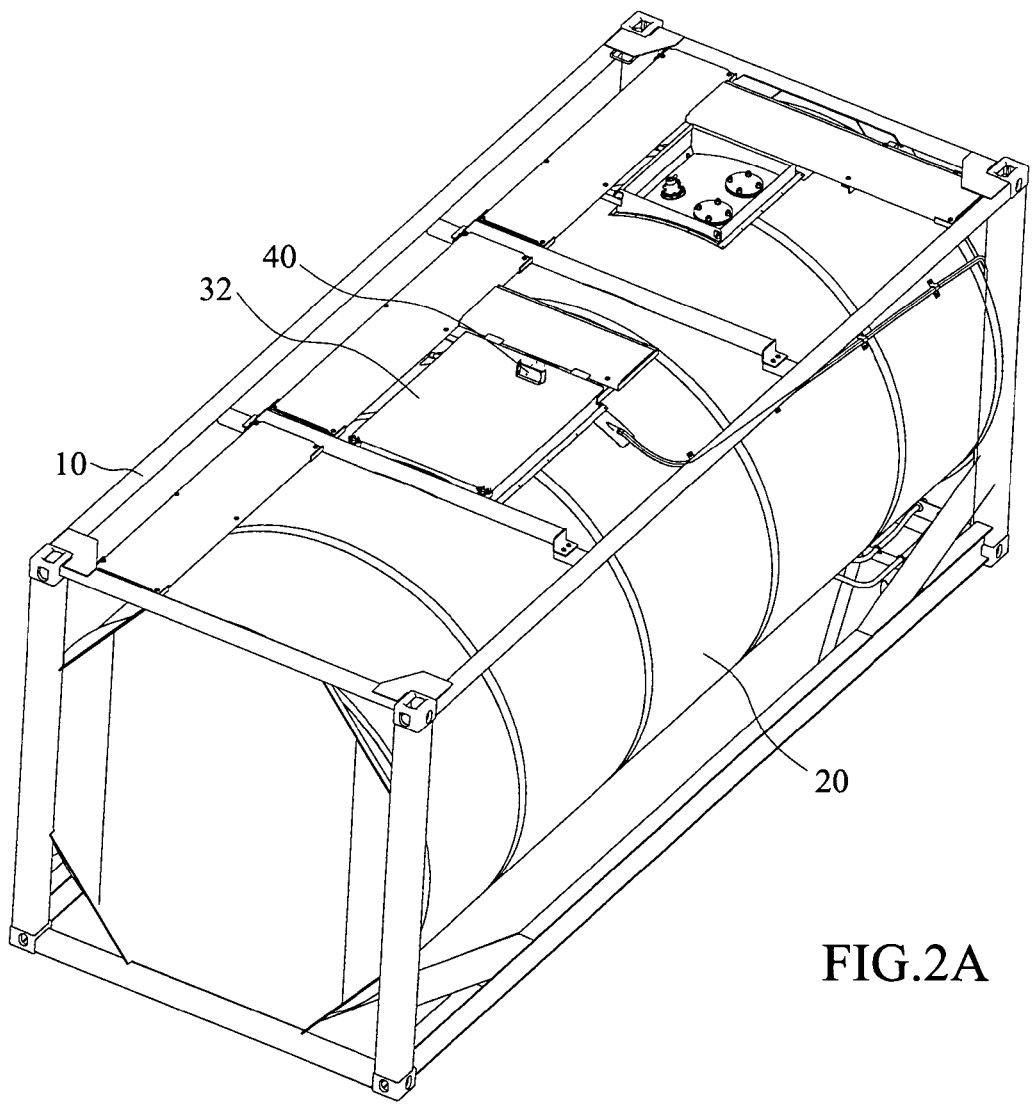
FIG. 2A is a schematic view showing a closed state of the valve assembly protection box of the tank container in FIG. 1A.
Figure 2B:
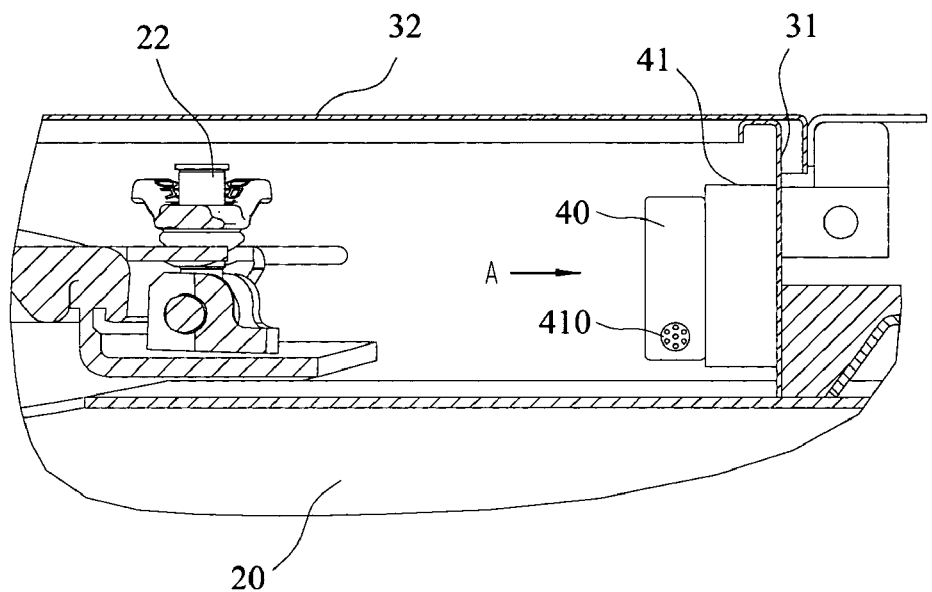
FIG. 2B is a partial sectional view of the electronic monitoring device when the valve assembly protection box in FIG. 2A is closed.
Figure 2C:
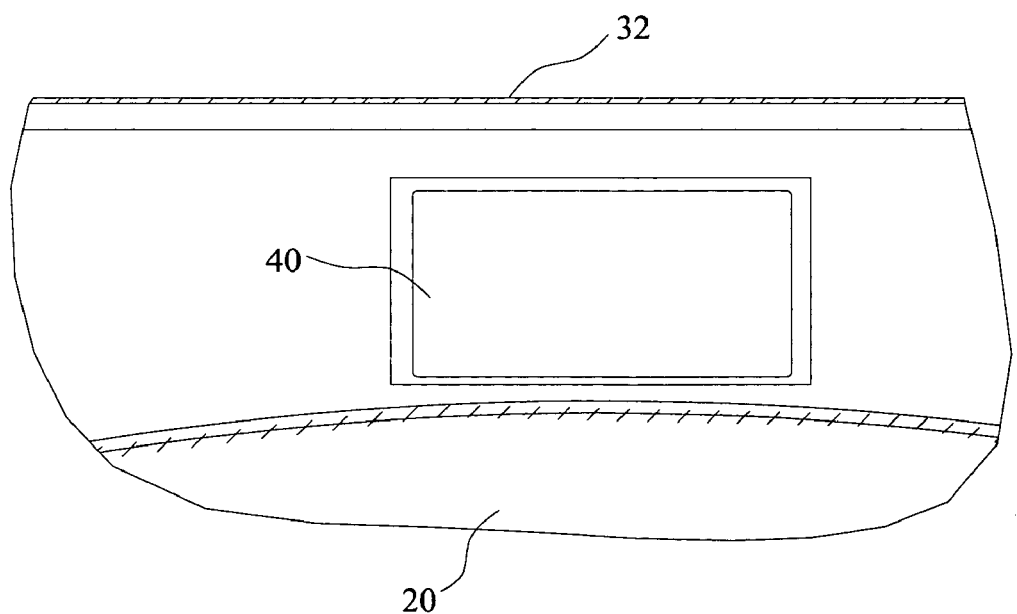
FIG. 2C is a view of the electronic monitoring device taken along direction A in FIG. 2B

FIGS. 2A-2C illustrate a closed state of the valve assembly protection box 30 of the first embodiment of the tank container in FIG. 1A. At this time, the opening end of the lid 32 can be locked by a TIR sealing closure.

Figure 3A:
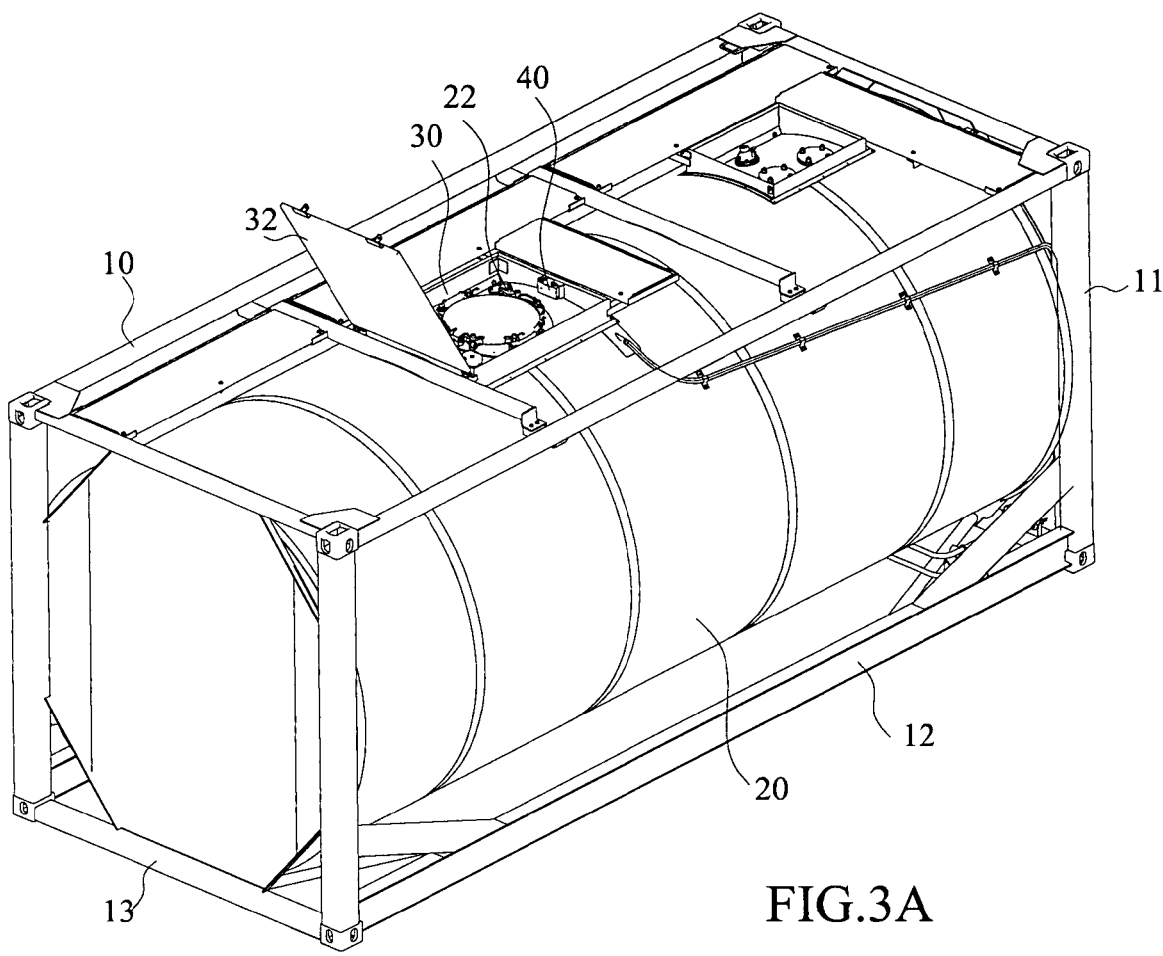
FIG. 3A is a schematic view showing a structure of a second embodiment of the tank container with electronic monitoring device according to the invention, in which the electronic monitoring device has a stroke switch.
Figure 3B:
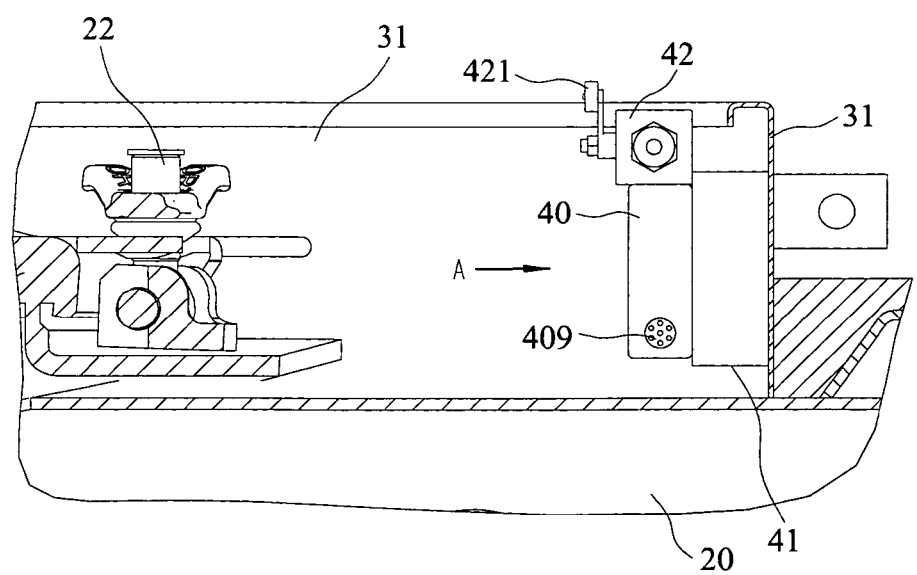
FIG. 3B is a partial sectional view of the electronic monitoring device when the valve assembly protection box in FIG. 3A is opened.
Figure 3C:
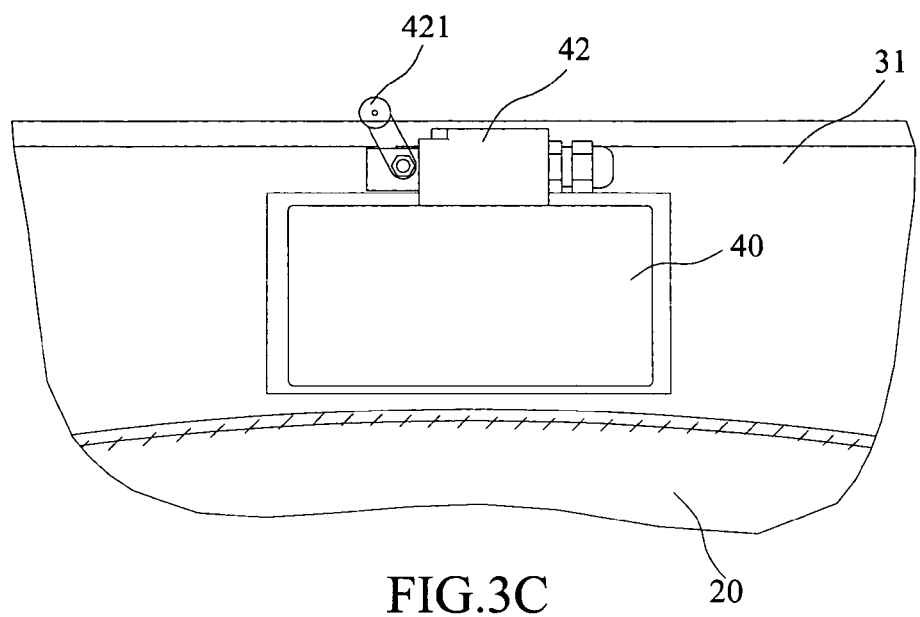
FIG. 3C is a view of the electronic monitoring device taken along direction A in FIG. 3B
Figure 4A:
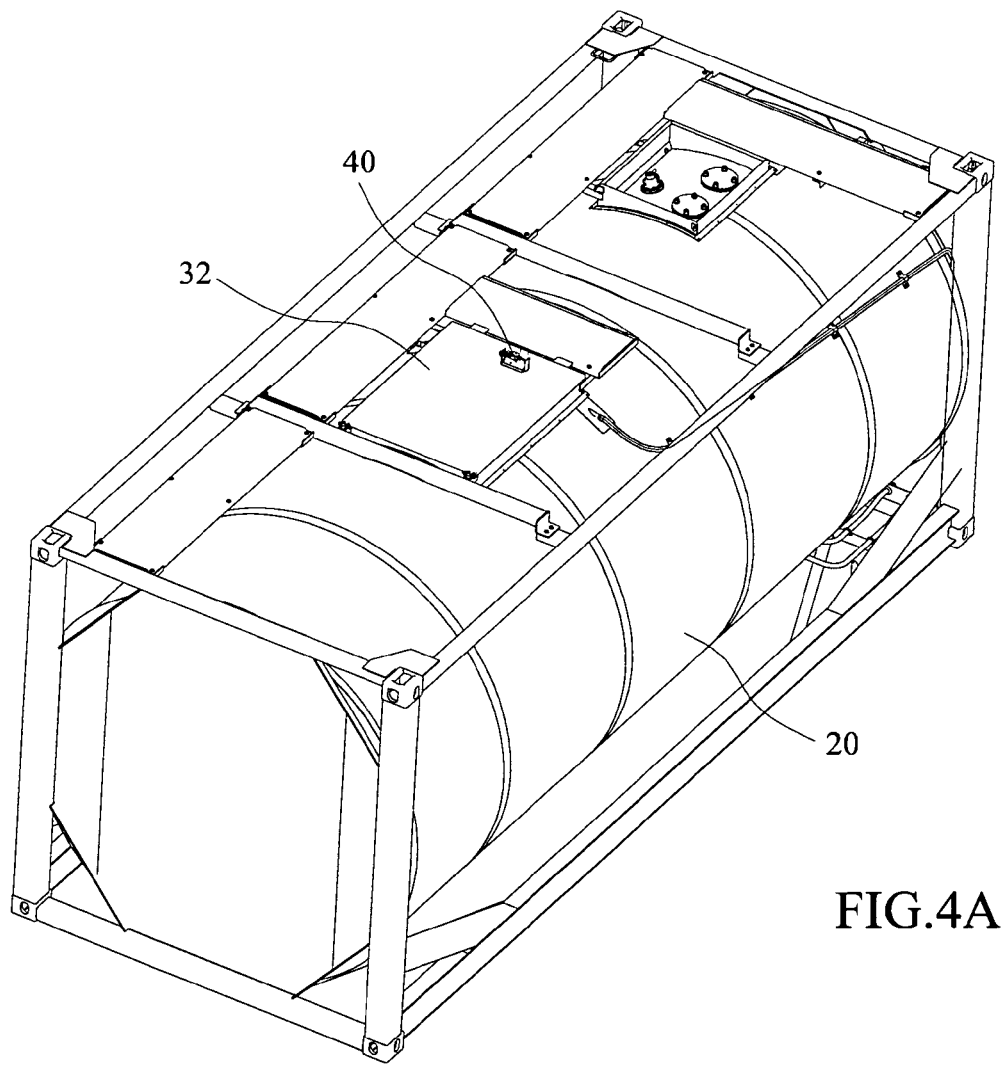
FIG. 4A is a schematic view showing a closed state of the valve assembly protection box of the tank container in FIG. 3A.
Figure 4B:
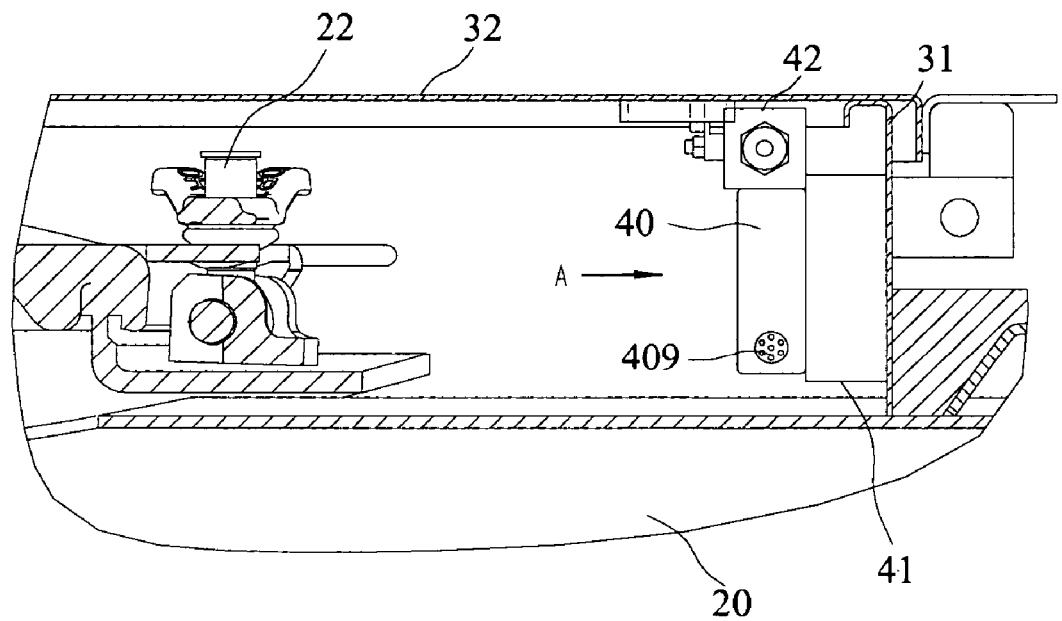
FIG. 4B is a partial sectional view of the electronic monitoring device when the valve assembly protection box in FIG. 4A is closed.
Figure 4C:
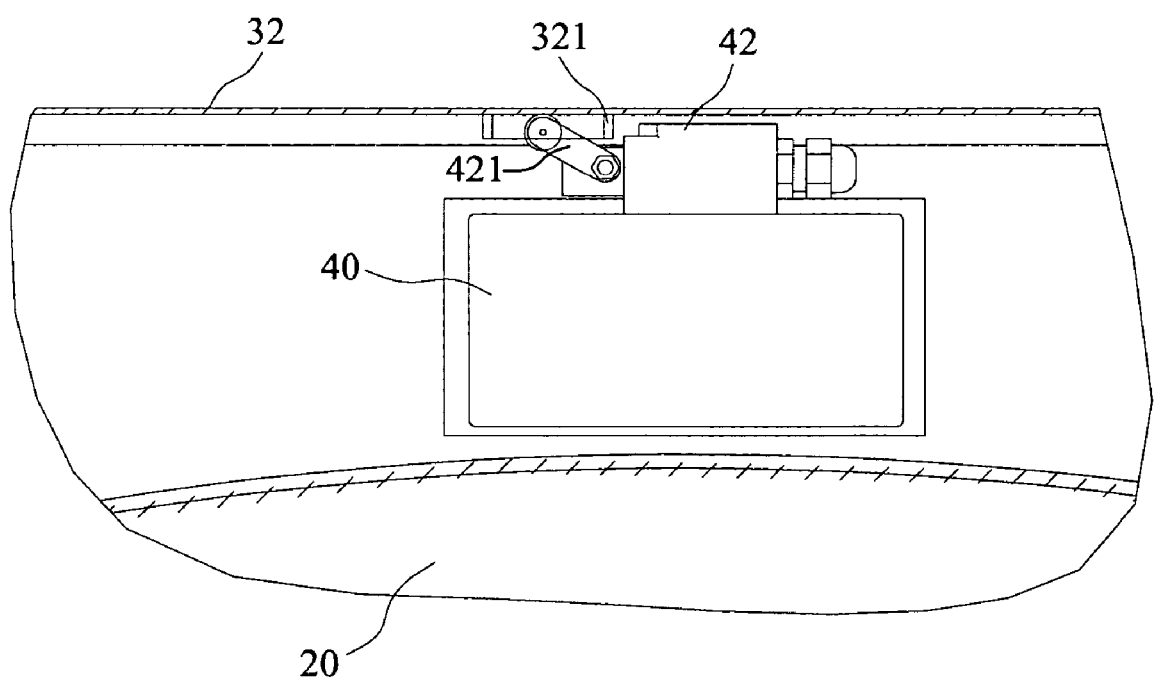
FIG. 4C is a view of the electronic monitoring device taken along direction A in FIG. 4B

FIGS. 3A-3C and FIGS. 4A-4D illustrate the structure of a second embodiment of a tank container with electronic monitoring device according to the invention. In the second embodiment, different from the first embodiment, the electronic monitoring device 40 further includes a stroke switch 42 with a probe 421. Specially, the stroke switch 42 has a first and a second position. At the first position, as shown in FIG. 4C, the probe 421 of the stroke switch 42 gets in contact with the lid 32 of the valve assembly protection box 30, i.e. the lid 32 presses the probe 421; at this time, a circuit in the stroke switch 42 is at a "on" status, placing the stroke switch 42 in a normal operating state. At the second position, as shown in FIG. 3C, the probe 421 separates from the lid 32, and the circuit in the stroke switch 42 is "off", thereby placing the stroke switch 42 in a non-normal operating state. The stroke switch 42 is mainly used for detecting a possible illegal opening of the valve assembly protection box 30. When the lid 32 is closed, the probe 421 is pressed against the lid 32, and the circuit in the stroke switch 42 is "on" and acts. Once the lid 32 is illegally opened, departing from the stroke switch by a predetermined safe distance, i.e., the probe 421 is separated from the lid 32, the circuit in the stroke switch is turned "off", with a signal sent for recording or alarming.

Figure 4D:
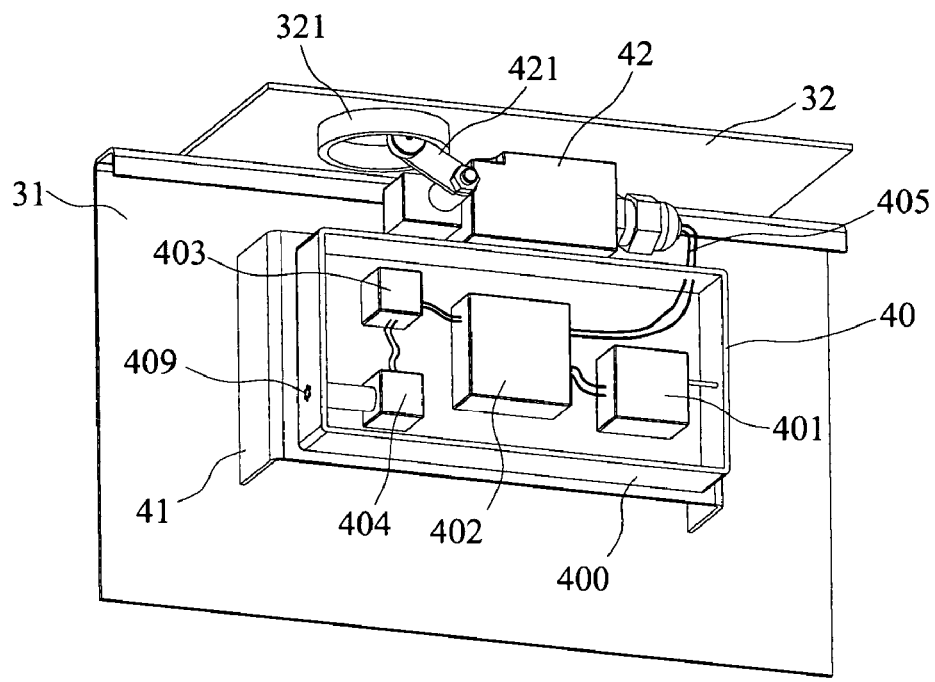
FIG. 4D is a perspective view showing a structure of the electronic monitoring device in FIG. 4B.

In detail, FIG. 4D illustrates the structure of the electronic monitoring device of the second embodiment according to the invention. In FIG. 4D, the electronic monitoring device 40 includes a sensor 403, a data processing module and a stroke switch 42. The sensor 403 can sense the outside gas by means of a sucking pump 404 sucking gas through a mouth 409 disposed on a box 400. Alternatively, by directly disposing a sensing window on the box 400, the sensor 403 also can sense outside gas. The data processing module includes a signal acquisition and processing module 402 communicating with the sensor 403, acquiring and processing the data transmitted by the sensor 403; and a data storage and signal transmission module 401 communicating with the signal acquisition and processing module 402 for storing and recording the processed data, and further transmitting the data to a remote data terminal. The signal acquisition and processing module 402 is connected with the stroke switch 42 through a cable 405. The module 402 receives a signal of opening or closing the valve assembly protection box 30 detected by the stroke switch 42 as well as the transmitted signal of the substance concentration in the container detected by the sensor 403, which are then processed, stored, and recorded, and are further transmitted, through a data storage and signal transmission module 401, to a remote data terminal for alarming or monitoring etc.

Preferably, as shown in FIG. 4D, a protection device 321 providing a protection space is further disposed on the lid 32 at a place corresponding to the probe 421, which can be a protection ring, or a protection plate facing the reinforced protection rib 311 when the lid 32 is closed. The protection device 321 receives the probe 421 in its protection space when the lid 32 is closed, thereby preventing the probe 421 from being damaged by an inserted strip (in a case of using an inserted strip to produce a false closed condition).

As described above, the electronic monitoring device 40 of the first embodiment can also include all structures except the stroke switch 42 of the second embodiment, such as the sensor, the data processing module. In addition, the stroke switch 42 of the second embodiment can be a magnetic-reed switch or the like, for monitoring the open/close status of the valve assembly protection box.

Figure 5A:
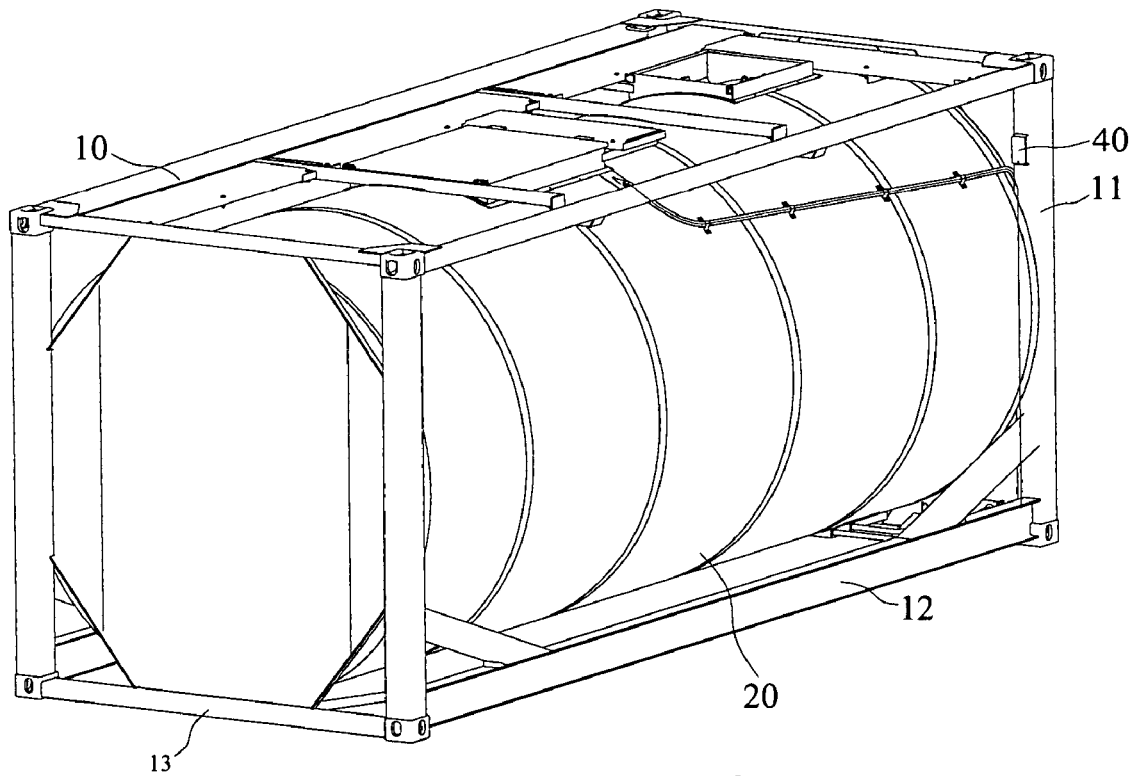
FIG. 5A is a schematic view showing a structure of a third embodiment of the tank container with electronic monitoring device according to the invention.
Figure 5B:
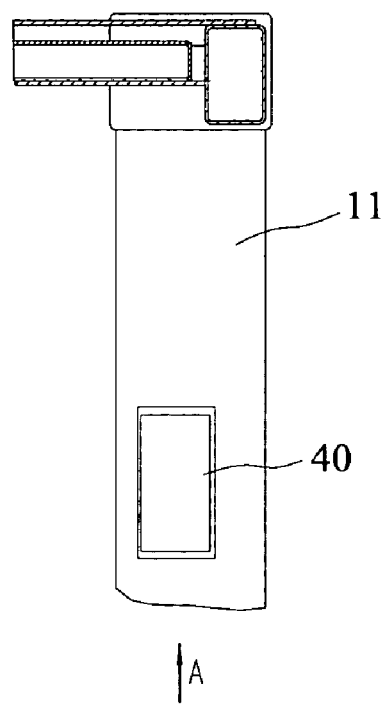
FIG. 5B is a partially enlarged view showing an installation position of the electronic monitoring device in FIG. 5A.
Figure 5C:
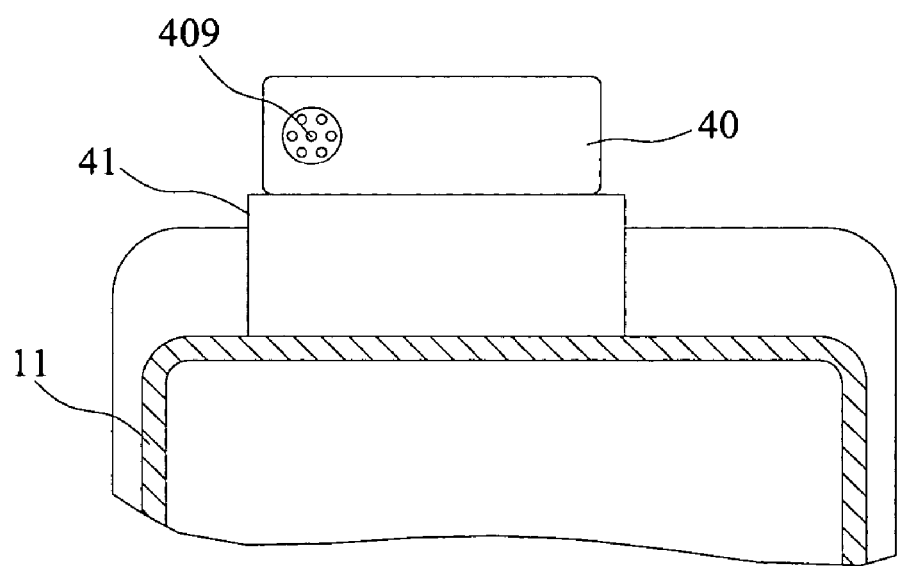
FIG. 5C is a view of the electronic monitoring device taken along direction A in FIG. 5B
Figure 5D:
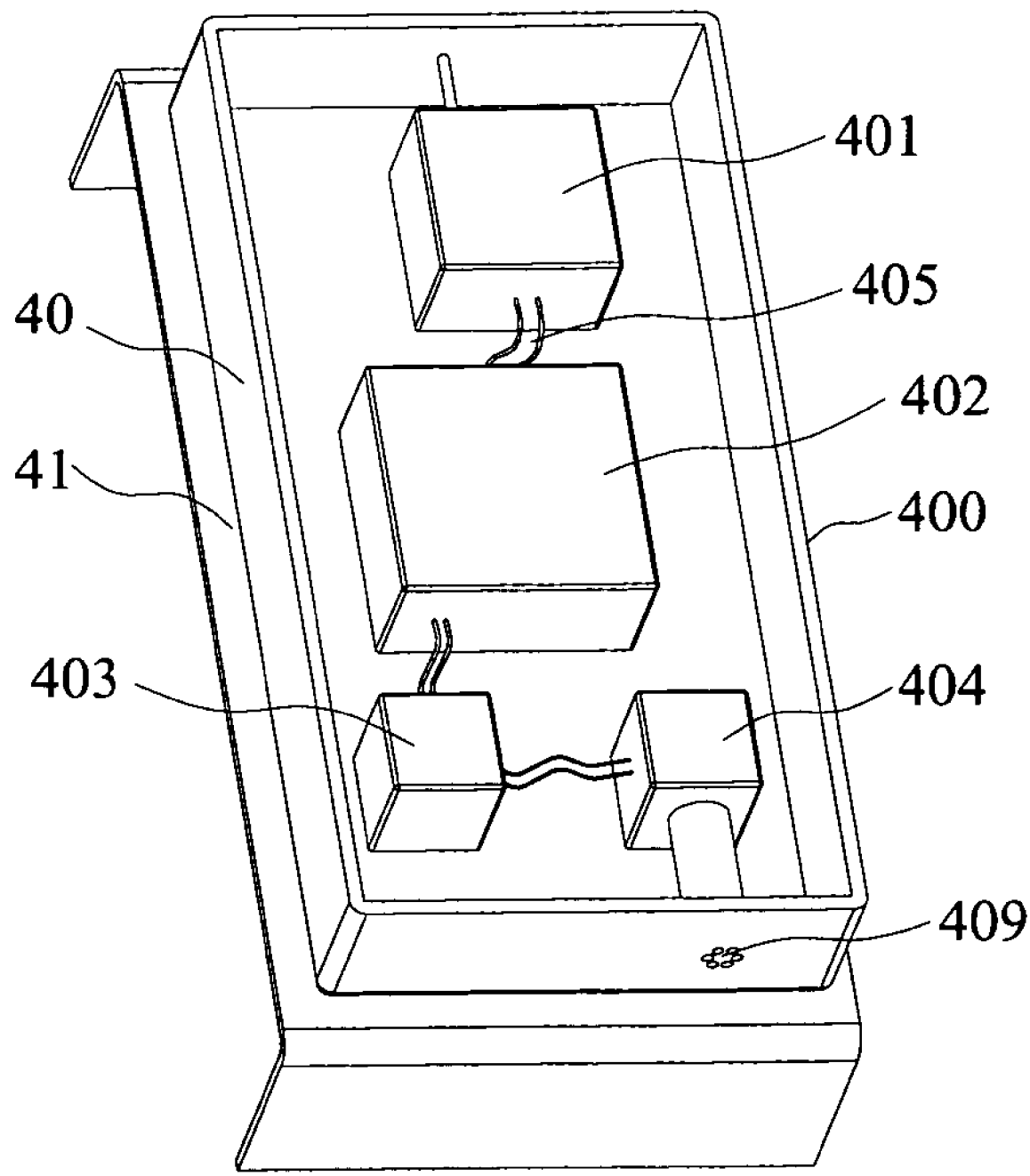
FIG. 5D is a perspective view showing a structure of the electronic monitoring device in FIG. 5B.

FIGS. 5A-5D illustrate the structure of a third embodiment of a tank container with electronic monitoring device according to the invention. Different from the first embodiment, the electronic monitoring device 40 is disposed in a range of the container frame 10 outside the tank barrel 20, as shown in FIG. 5B, particularly on the frame corner post 11 for detecting the sealing condition of the tank barrel. As shown in FIG. 5D, in the third embodiment, the electronic monitoring device 40 is installed through a support 41. In a box 400, a data storage and signal transmission module 401, a signal acquisition and processing module 402, a sensor 403, and a sucking pump 404 are provided, which connect with each other through a cable 405. The sucking pump 404 sucks gas through a mouth 409 on the box 400, whereby the sensor 403 performs detection.

Of course, the electronic monitoring device 40 can also be installed at a position near the sealing surface of the flange and/or the valve assembly.

Figure 6:
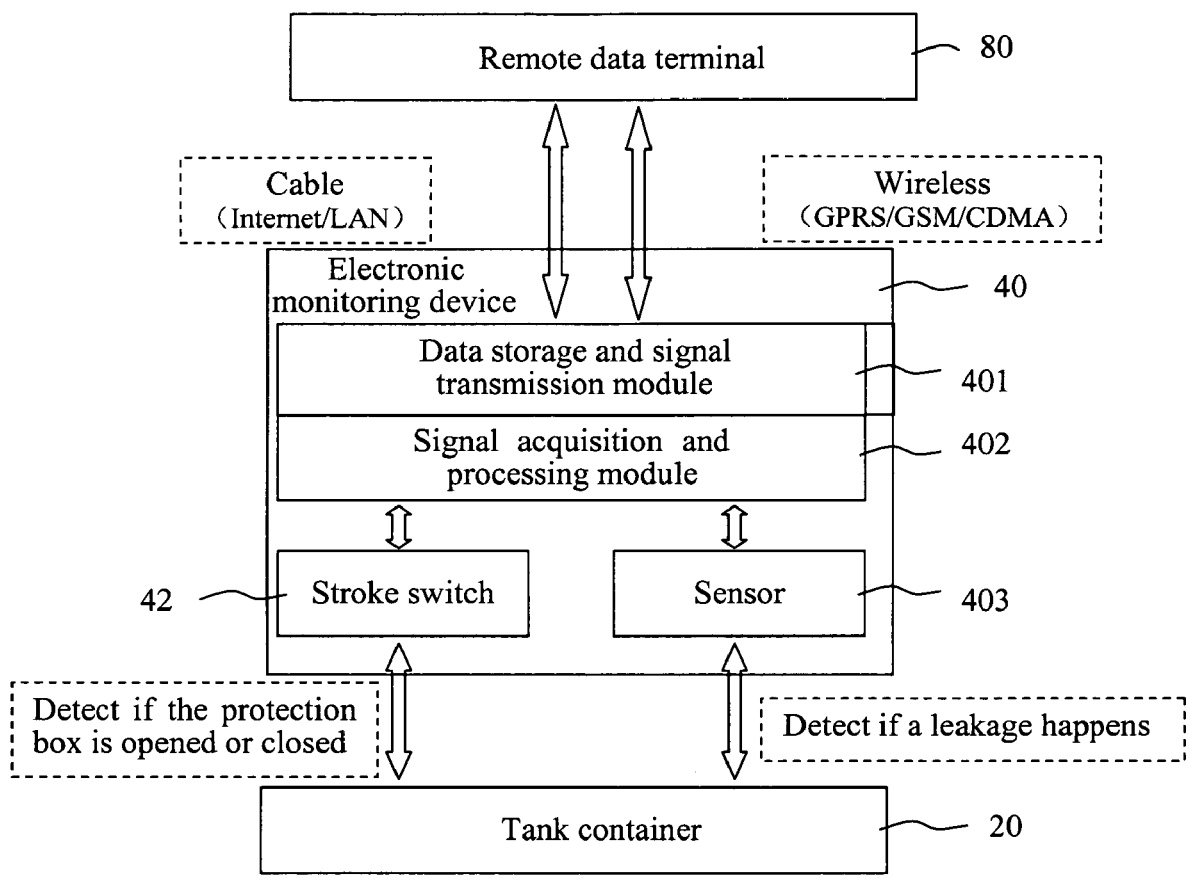
FIG. 6 is a block diagram showing the operation principle of the electronic monitoring device of the tank container with electronic monitoring device according to the invention.

FIG. 6 shows the operation principle of the electronic monitoring device 40 according to the invention. As shown in FIG. 6, preferably, the electronic monitoring device 40 further communicates with a remote data terminal 80 through a cable or in a wireless way. The signal acquisition and processing module 402 receives the data from the stroke switch 42 and the sensor 403 through a data transmission interface (such as an RS 232 interface) and processes the same. The above data can be stored and recorded in the data storage and signal transmission module 401, and can be transmitted via a cable through Internet/LAN to the remote data terminal 80, to send the related information and alarm. The above data can also be transmitted wirelessly to the remote data terminal 80 through GPRS/GSM/CDMA.

According to the invention, the sensor 403, the data processing module and a main body of the stroke switch 42 can be made in one box to form an integrated product, which will be assigned a unique product ID code stored in the data storage and signal transmission module 401. When the signal acquired through the stroke switch 42 and the sensor 403, as well as the alarming signal generated in emergency, is transmitted through Internet/LAN (cable) or GPRS/GSM/CDMA (wireless) to the remote data terminal 80, the ID code of the electronic monitoring device 40 can be transmitted therewith to the remote data terminal 80. In the database of the remote data terminal 80, a relating information of each electronic monitoring device, such that which container it belongs to, what is the ID code, etc. is registered, and the information will be linked with the data detected through the container, to realize a global tracking and detection.

It is apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A tank container with an electronic monitoring device, comprising:
    a tank barrel and a container frame for supporting said tank barrel, said tank barrel being further provided with a valve assembly and a valve assembly protection box for enclosing and protecting said valve assembly, wherein said electronic monitoring device is installed inside said valve assembly protection box and further includes:
    a sensor for detecting a leakage condition of substances contained in said tank container and transmitting an information data related to the leakage condition;
    a data processing module connected with said sensor for processing the data related to the leakage condition and including:
        a signal acquisition and processing module connected with said sensor for acquiring and processing the data from the sensor related to said leakage; and
        a data storage and signal transmission module connected with said signal acquisition and processing module for storing and recording the data on said leakage processed by said signal acquisition and processing module, and transmitting the data on said leakage to a remote data terminal; and
    a stroke switch with a probe connected with said signal acquisition and processing module through a cable, wherein said probe can be pressed against or separated by a certain safe distance from a lid of said valve assembly protection box, to place the stroke switch in a normal or non-normal operating status, correspondingly.

2. A tank container with electronic monitoring device according to claim 1, wherein a protection device providing a protecting space is disposed at a position corresponding to said stroke switch probe on the lid of said valve assembly protection box, for receiving said probe in the protection space when said stroke switch is at a second position.

3. A tank container with electronic monitoring device according to claim 2, wherein said electronic monitoring device is installed on an inner wall at an opening side of said valve assembly protection box, said inner wall partially or wholly turning towards an inner part of said valve member protection box and extending a predetermined distance to form a reinforced protection rib.

4. A tank container with electronic monitoring device according to claim 3, wherein said protection device is a protection plate disposed facing the reinforced protection rib.

5. A tank container with electronic monitoring device according to claim 3, wherein said protection device is a protection ring.

6. A tank container with an electronic monitoring device, comprising:
   a tank barrel and a container frame for supporting said tank barrel, said tank barrel being further provided with a valve assembly and a valve assembly protection box for enclosing and protecting said valve assembly, wherein said electronic monitoring device is installed inside said valve assembly protection box and further includes:
   a sensor for detecting a leakage condition of substances contained in said tank container and transmitting an information data related to the leakage condition;
   a data processing module connected with said sensor for processing the data related to the leakage condition and including:
      a signal acquisition and processing module connected with said sensor for acquiring and processing the data from the sensor related to said leakage; and
      data storage and signal transmission module connected with said signal acquisition and processing module for storing and recording the data on said leakage processed by said signal acquisition and processing module, and transmitting the data on said leakage to a remote data terminal; and
   a magnetic-reed switch for detecting an open or closed status of said valve assembly protection box.

7. A tank container with an electronic monitoring device, comprising:
   a tank barrel and a container frame for supporting said tank barrel, said tank barrel being further provided with a valve assembly; and
   a valve assembly protection box provided on said tank barrel for enclosing and protecting said valve assembly;
   said electronic monitoring device including:
      a sensor for detecting a leakage condition of substances contained in said tank container and transmitting an information data related to the leakage condition; and
      a data processing module connected with said sensor for processing the data related to the leakage condition; and
      a box for receiving the sensor and the data processing module, wherein a sensing window is arranged at a position on the box corresponding to a sensing head of said sensor.

8. A tank container with electronic monitoring device according to claim 7, wherein said electronic monitoring device is installed on a position near a sealing surface of a flange and/or the valve assembly of said tank barrel.

9. A tank container with electronic monitoring device according to claim 7, wherein said electronic monitoring device is installed on said container frame.

10. A tank container with an electronic monitoring device, comprising:
    a tank barrel and a container frame for supporting said tank barrel, said tank barrel being further provided with a valve assembly; and
    a valve assembly protection box provided on said tank barrel for enclosing and protecting said valve assembly;
    said electronic monitoring device including:
       a gas sensor for detecting a gas concentration escaped from said tank container indicating a leakage condition of substances contained in said tank container and transmitting an information data related to the leakage condition; and
       a data processing module connected with said sensor for processing the data related to the leakage condition; and
       a box for receiving the gas sensor and the data processing module, wherein said gas sensor is connected with a sucking pump that sucks gas through a mouth disposed on said box for performing a gas detection.

11. A tank container with electronic monitoring device according to claim 10, wherein said electronic monitoring device is fixed by a support.

12. A tank container with electronic monitoring device according to claim 10, wherein said electronic monitoring device has a unique ID code stored in said data storage and signal transmission module, said ID code being able to be transmitted to said remote data terminal.

* * * * *